US009802330B2

(12) United States Patent
Hoover et al.

(10) Patent No.: US 9,802,330 B2
(45) Date of Patent: Oct. 31, 2017

(54) DOCUMENT PRODUCTION SYSTEM AND METHOD WITH AUTOMATED DIE EXCHANGE

(71) Applicant: Xerox Corporation, Norwalk, CT (US)

(72) Inventors: Linn C. Hoover, Webster, NY (US); William J. Nowak, Webster, NY (US); William J. Hannaway, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/219,867

(22) Filed: Jul. 26, 2016

(65) Prior Publication Data

US 2017/0015014 A1 Jan. 19, 2017

Related U.S. Application Data

(62) Division of application No. 13/564,415, filed on Aug. 1, 2012, now abandoned.

(51) Int. Cl.

*B62D 5/02* (2006.01)
*B26D 5/02* (2006.01)
*B26D 5/00* (2006.01)
*B26D 7/26* (2006.01)
*B41F 13/56* (2006.01)
(Continued)

(52) U.S. Cl.
CPC ................. *B26D 5/02* (2013.01); *B26D 5/00* (2013.01); *B26D 5/34* (2013.01); *B26D 7/26* (2013.01); *B26F 1/384* (2013.01); *B41F 13/56* (2013.01); *B41J 11/70* (2013.01); *Y10T 29/49002* (2015.01); *Y10T 83/0524* (2015.04); *Y10T 83/533* (2015.04); *Y10T 83/9372* (2015.04); *Y10T 83/9411* (2015.04); *Y10T 483/13* (2015.01); *Y10T 483/18* (2015.01)

(58) Field of Classification Search
CPC ... B26D 5/02; B26D 5/34; B26D 5/00; B26D 7/26; B41J 11/70; B26F 1/384; B41F 13/56; Y10T 83/9411; Y10T 83/9372; Y10T 83/533; Y10T 83/0524; Y10T 483/13; Y10T 29/49002; Y10T 483/18
See application file for complete search history.

(56) References Cited

U.S. PATENT DOCUMENTS 3,073,024 A * 1/1963 Hutchens ........... B23Q 3/15766 408/20
3,459,084 A * 8/1969 Schlafly ................... G06K 1/00 234/106

(Continued)

FOREIGN PATENT DOCUMENTS

CA 2 409 330 11/2001
DE 41 13 797 11/1997

(Continued)

*Primary Examiner* — Sean Michalski
(74) *Attorney, Agent, or Firm* — Alix, Yale & Ristas, LLP

(57) ABSTRACT

A media cutting system is disclosed comprising a die cutter including a cutting surface and a plurality of dies stored proximate the cutting surface, a die exchange system including a die storage system configured to support the plurality of dies and a die transport system, and a computer system comprising a controller configured to operate the die transport system and the die cutter. A die exchange system and methods of making and using the die exchange system also are disclosed.

19 Claims, 12 Drawing Sheets

(51) Int. Cl.
*B26D 5/34* (2006.01)
*B26F 1/38* (2006.01)
*B41J 11/70* (2006.01)

(56) References Cited

U.S. PATENT DOCUMENTS 3,709,623 A * 1/1973 Stephan ................ B23B 31/265 29/26 A
3,727,442 A * 4/1973 Ridgway ................ B21D 22/00 483/1
4,047,358 A * 9/1977 Heffernan ............... B29C 51/00 264/510
4,095,498 A 6/1978 Biggar, III
4,168,644 A * 9/1979 Leibinger .............. B23D 27/00 192/129 B
4,220,062 A * 9/1980 Blanz ................... B21D 28/246 83/405
4,359,815 A * 11/1982 Toyoda .............. B23Q 3/15713 414/225.01
4,415,284 A 11/1983 Floyd
4,587,716 A * 5/1986 Bytow ................. B21D 37/145 483/14
4,632,000 A 12/1986 Cantella
4,697,485 A 10/1987 Raney
4,951,375 A * 8/1990 Erlenmaier .......... B21D 37/145 483/14
5,215,513 A * 6/1993 Maynard ................ B21D 28/12 483/29
5,224,915 A * 7/1993 Kilian .................... B21D 28/12 483/1
5,259,285 A 11/1993 Uchida
5,318,496 A * 6/1994 Takahashi .............. B21D 28/12 483/1
5,342,276 A * 8/1994 Fujiwara ................ B21D 28/12 483/29
5,636,966 A * 6/1997 Lyon .................... B65G 1/1378 414/789.6
5,669,866 A * 9/1997 Julian .................. B21D 28/246 483/1
5,743,035 A 4/1998 Bradley et al.
5,805,193 A 9/1998 Follett et al.
5,827,159 A 10/1998 Adachi
5,918,542 A 7/1999 Ruprecht
6,013,017 A * 1/2000 Aizawa ................ B21D 28/246 483/29
6,062,751 A 5/2000 Baum
6,095,011 A * 8/2000 Brogårdh ............... B25J 9/1065 248/278.1
6,112,658 A 9/2000 Gunther et al.
6,626,111 B2 9/2003 Hirsch
6,694,872 B1 2/2004 LaBelle et al.
6,786,148 B2 9/2004 Friedrichs et al.
6,846,276 B2 * 1/2005 Yasumatsuya ....... G05B 19/182 483/1
6,986,306 B2 1/2006 McKillip
7,027,879 B2 * 4/2006 Yamamoto ........... B21D 28/246 408/31
7,175,578 B2 2/2007 Elkis et al.
7,476,191 B2 1/2009 Putch et al.
7,871,479 B2 1/2011 Garland
7,900,543 B2 * 3/2011 Ikeda ..................... B21D 28/12 83/532
8,523,746 B2 * 9/2013 Haus .................. B23Q 3/15526 211/1.56
2001/0054344 A1 * 12/2001 Sakamoto .............. B21D 28/34 83/698.91
2002/0056749 A1 * 5/2002 Hetzer ............... B23Q 3/15546 235/454
2004/0166238 A1 8/2004 Nowicki et al.
2005/0016341 A1 1/2005 Lorenzi
2005/0247173 A1 11/2005 Alsten et al.
2007/0220828 A1 9/2007 Woodman et al.
2008/0216623 A1 9/2008 Hansmann et al.
2009/0100896 A1 * 4/2009 Akami ..................... B21D 5/02 72/389.4
2009/0223273 A1 * 9/2009 Erlenmaier ............ B21D 28/24 72/407
2010/0095815 A1 * 4/2010 Laib ....................... B21D 28/14 83/23
2010/0095824 A1 * 4/2010 Laib ....................... B21D 28/14 83/549
2011/0107888 A1 * 5/2011 Thielges .............. B21D 28/005 83/139
2011/0122212 A1 5/2011 Pettersson et al.
2011/0151044 A1 * 6/2011 Kato ...................... B21D 37/14 425/183
2012/0060580 A1 * 3/2012 Buettner ................ B21D 28/00 72/481.1
2012/0096917 A1 * 4/2012 Chazal ..................... B21D 1/02 72/455
2012/0309600 A1 * 12/2012 Schindewolf .......... B21D 37/04 483/59
2012/0312067 A1 * 12/2012 Broadbent ............. B21D 28/34 72/462
2013/0133489 A1 * 5/2013 Este ....................... B26D 5/007 83/13
2013/0310237 A1 * 11/2013 Kojima .................. B21D 37/14 483/28
2013/0319194 A1 * 12/2013 Reiter .................... B21D 45/08 83/23
2013/0340584 A1 * 12/2013 Hoepner ................ B65H 20/34 83/23
2014/0038799 A1 * 2/2014 Klinkhammer .... B23Q 3/15526 483/1
2014/0121084 A1 * 5/2014 Klinkhammer ...... B21D 37/145 483/1

FOREIGN PATENT DOCUMENTS

DE 101 24 068 2/2002
DE 10 2004 016 373 11/2004
DE 10 2005 032 014 11/2006
EP 0 542 385 5/1993
JP 2006-150735 6/2006

* cited by examiner

DOCUMENT PRODUCTION SYSTEM AND METHOD WITH AUTOMATED DIE EXCHANGE

BACKGROUND

The presently disclosed embodiments relate generally to an apparatus and method for producing documents, and more particularly to a document production system and method incorporating a die exchange system for use with a media cutter.

Conventional systems for producing three-dimensional and non-rectangular two-dimensional documents include a printing system, a cutting system, and in some cases a coating system. Known techniques for cutting print media frequently use a digital cutter or a die cutter. For small cutting jobs having fewer than 100 pieces, the cost per cut unit is high when operating conventional equipment, because either a labor-intensive manual feed unit will be used, or an expensive, complex machine will be employed, resulting in high overhead costs. Furthermore, it is difficult to efficiently process mid-sized cutting jobs of 100-1000 pieces, which may take 5-10 minutes or more to process the media, because the manual die set-up time will add 10-15 minutes to the total time required for each job. It would be useful to develop a system and method for efficiently processing low volume and moderately sized cutting jobs using a die cutter.

Current packaging cut and crease finishers that utilize manual cutting die exchange and setup include buffer systems for incoming jobs, or will stop the digital press until the cutter is ready to receive a job. It would be useful to develop a media cutting system using a die cutter that could match the media throughput rate of an upstream and/or downstream printing and/or finishing operation.

SUMMARY

According to aspects illustrated herein, there is provided a media cutting system comprising a die cutter including a cutting table and a plurality of dies stored proximate the cutting table, a die exchange system configured to automatically move a die between a storage position and a cut-ready position, the die exchange system including a die storage system configured to support the plurality of dies and a die transport system, and a computer system comprising a controller configured to operate the die transport system and the die cutter.

Another embodiment described herein is a die exchange system comprising a die storage system including a plurality of supports configured to support a plurality of cutting dies, an automatic die transport system configured to automatically transport dies in and out of the die storage system, the automatic die transport system including a die loader configured to move dies horizontally in and out of a storage position in the die storage system, an elevator assembly associated with at least one of the die storage system and the automatic die transport system, the elevator assembly including a drive configured to vertically displace a die that is moved out of a storage position to be placed in a cut-ready position, and a computer comprising a die exchange controller configured to operate the die loader and the elevator assembly.

A further embodiment is a method of making a media cutter, comprising obtaining a die cutter, a die storage system, a die transport system, and a controller, positioning the die cutter, die storage system and die transport system in proximity to one another to enable dies to be automatically transferred from the die storage system to the die cutter using the die transport system, and programming the controller to automatically transport dies in and out of the die cutter in response to computerized instructions received by the controller.

Yet another embodiment described herein is a method of cutting media, comprising obtaining a first set of media sheets, automatically selecting a first die to be used to cut the first set of media sheets, automatically positioning the first die in a die cutter in a cutting position, automatically adjusting cutting parameters for the first die, cutting the first set of media sheets using the first die, automatically removing the first die from the die cutter, obtaining a second set of media sheets, automatically selecting a second die to be used to cut the second set of media sheets, automatically positioning the second die in the die cutter in a cutting position, automatically adjusting cutting parameters for the second die, and cutting the second set of media sheets using the second die.

DETAILED DESCRIPTION

Figure 1:
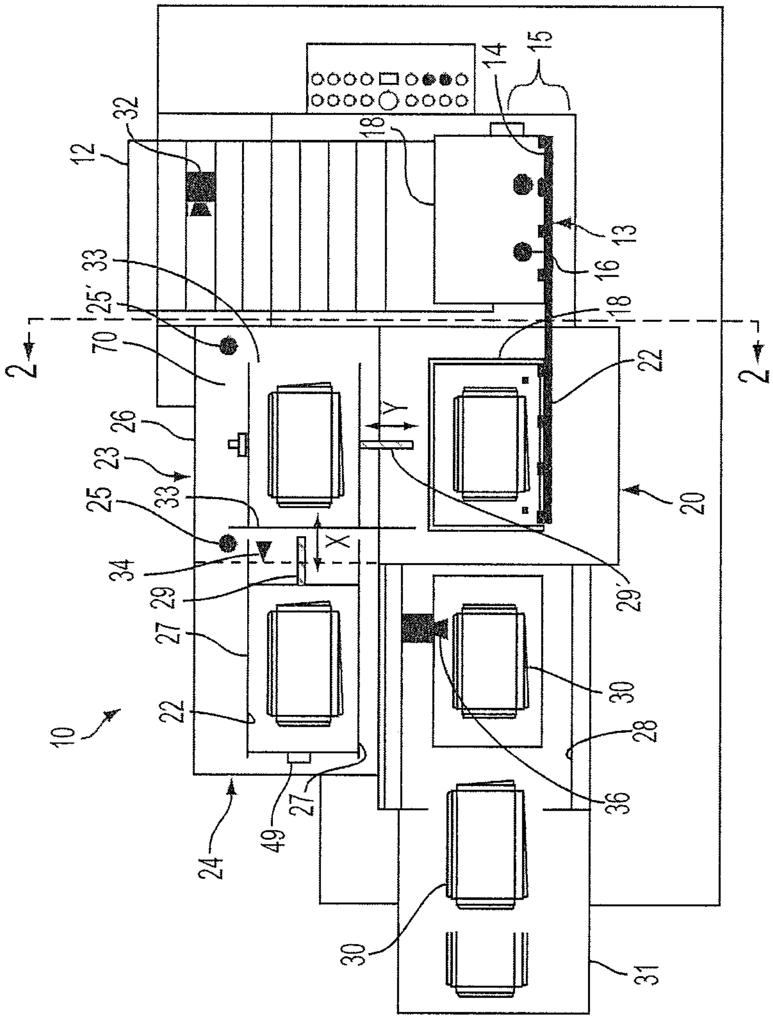
FIG. 1 is a schematic plan view of a media cutter including an automated die exchange system according to a first embodiment.

As used herein, the term “media” refers to any sheet-shaped stock, such as paper, cardboard, paper board, vinyl, plastic etc. As used herein a “sheet” of media refers to an individual medium, which usually has a flat configuration but also can have other configurations. “Cut” means to cut, score, crease and/or emboss. A “die cutter” is a device used to cut, score, crease and/or emboss media using a die to shear a sheet or web of material, and includes rotary die cutters and flat die cutters. A die is in a “cutting position” when it is located in a die cutter (before or after attachment). A die is in an “operating position” when attached in a die cutter for use. A die is in a “cut-ready position” when attached in a die cutter and ready for use. The word “printer” as used herein encompasses any apparatus, such as a digital copier, bookmaking machine, facsimile machine, multi-function machine, and the like, which performs a print outputting function for any purpose.

One embodiment described herein is an in-line die cutter with automated die exchange and setup that provides for media throughput at a rate that reduces the time that the printed material spends in a buffer zone between a printer and a cutter. In some cases, the in-line cutter matches the media throughput and production rates for upstream and/or downstream digital printing presses, thereby rendering unnecessary the use of a buffer zone upstream from the cutter. In embodiments, the controller for die exchange is configured to receive die selection data from a processor associated with the printer.

Some production digital printing presses are capable of producing a continuous stream of short run folded carton and corrugated packaging jobs in excess of 100 sheets per minute (SPM). The collection of integrated capabilities of the system described herein employing automatic die exchange, managed automatically by workflow software, create a productivity enhancement as compared to conventional systems that require manual die exchange.

The use of a cassette or other multiple die management module enables automated die exchange within a packaging workflow for existing flat die or rotary die cutters without requiring operator setup or intervention for registration tuning. The system can be retrofit to a cutter, or assembled as part of a new integrated cutter with die exchange, which in some cases is also integrated with a printer. The printer usually is a digital printer, but can be a flexo or lithographic printer. Multiple printers of different types can be affiliated with a single cutting system. The workflow concept and sensing systems that are included support job content communication and job queuing in an automatic and uninterrupted manner. The system requires limited operator intervention to load media and to service a fault if it occurs. This system is particularly useful in short run, repetitive jobs within a finishing/packaging house in which the productivity rate is important, thereby providing a maximum return on equipment and labor costs.

Another embodiment described herein is a computer program product comprising a computer-usable data carrier storing instructions that, when executed by a computer, cause the computer to perform a method. The method comprises instructing an apparatus to: position a first die in a die cutter in a cutting position, remove the first die from the die cutter after cutting, position a second die in the die cutter, and remove the second die after cutting.

Referring to the drawings and first to FIG. 1, one embodiment of a media cutting system is shown and is designated as 10. The media cutting system includes a conveyor 12 that transports media to a sheet registration tray 13. An automatic in-feeder 15 includes vacuum grippers 16 that register the sheet for die cutting, and mechanical grippers 14 that grip the sheet after registration and move it under the die 22. The in-feeder 15 separates the stack of media into individual sheets as shown on the feeder transport. The in-feeder 15 delivers individual sheets 18 of media to a die cutter 20. Other suitable technologies alternatively can be used to feed and register the sheets in the die cutter 20.

The die cutter 20 employs a die 22 from a die exchange system 23 that includes a die storage system 24 and a die transport system 26. Dies 22 are moved between the die cutter 20 and the die storage system 24 using the die transport system 26, described further below. In the embodiment shown in FIG. 1, to minimize the footprint of the media cutting system 10 and avoid interference with the cutting process, the die exchange system 23 is positioned on one side of the die cutter 20.

After cutting, the cut media 30 moves to an inspection station 28 for inspection of the cut quality. After inspection, the cut media 30 moves by conveyor and/or mechanical gripper to an out-feed tray 31 where it is vertically stacked. The cut media 30 can be separated from the surrounding scrap material manually or automatically at any point downstream from the die cutter 20.

The media cutting system optionally includes one, two, three or more sensors, including (1) an in-feed sensor 32 configured to detect the presence of incoming media and, in some embodiments, to read instructions regarding the type of print job and die to be used, and optionally other information, such as die setup parameters, (2) a die exchange sensor 34, which can be part of the die exchange system and is configured to read identifying information on the dies 22, and (3) an inspection station sensor 36 configured to detect the quality of the cuts in the media 30. Any suitable types of sensors can be used. In some embodiments, computerized sensors such as a BAR code, QR code, or RFID are employed.

Various mechanical systems can be used to transport a die in and out of the die cutter 20. To move a die from a storage position to a cutting position, the die usually is transported both horizontally and vertically. In the embodiments of FIG. 1, the die transport system removes a die from a stationary storage support, usually by horizontal displacement, and then vertically and horizontally transfers the die to the cutter 20. In certain other embodiments described below, a drive vertically displaces die storage supports in the die support system to enable a selected die to be vertically displaced before it is removed out of the support system and placed in the cutter.

Figure 2:
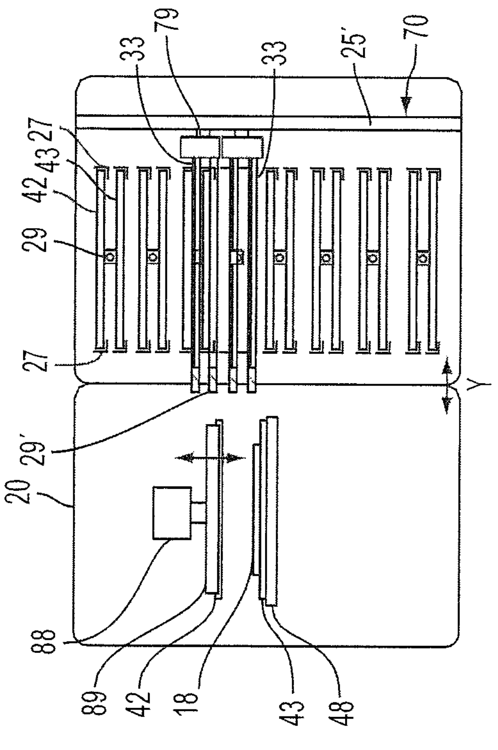
FIG. 2 schematically shows an elevational view of the media cutting system of FIG. 1, taken along line 2-2 of FIG. 1, having a stationary die storage system and a die transport system with an elevator assembly.

In the embodiment shown in FIGS. 1 and 2 that employs a stationary die storage system 24, the die storage system 24 includes pairs of horizontally extending rails 27, which support vertically spaced die plates 42 and backer plates 43. A die loader is used to transport a selected die plate and/or backer plate from the die storage system to the die cutter 20. In this embodiment, the die storage system includes rails 27. The die loader includes lead screws 29, loading arms 33, lead screws 29' and shafts 25 and 25'. When a particular die plate 42 and/or backer plate 43 are to be loaded into the die cutter 20, they are moved horizontally in the X direction along rails 27 using lead screws 29, or another suitable type of mechanism, such as belts, pneumatic plates, etc. The die plate 42 and/or backer plate 43 are transferred from rail pairs 27 to pairs of loading arms 33, which extend horizontally in the Y direction. An elevator assembly 70 including, for example, a pair of vertical shafts 25, 25', is used to move the loading arms 33 to the appropriate vertical height to receive the die plate 42 and/or backer plate 43. The top two sets of loading arms 33 (as depicted in FIG. 2) are operatively connected to the shaft by a connector 79. The terminal ends of the rails 27 are slightly spaced from the loading arms 33 to enable vertical movement of loading arms 33. The elevator assembly then moves the die plate 42 and/or backer plate 43 vertically in the Z direction to a suitable height beside the die cutter 20 for loading. Lead screws 29', or another suitable mechanism, are used to move the die plate 42 and backer plate 43 in the Y direction into the die cutter 20. A die plate 42 and a corresponding backer plate 43 can be moved with different lead screws, or one lead screw can be used to sequentially load both the die plate 42 and backer plate 43.

The embodiment shown in FIGS. 1 and 2 depicts four pairs of loading arms 33. The top two pairs of loading arms 33 are controlled by one elevator shaft 25 and the bottom two pairs of loading arms 33 are controlled by the other elevator shaft 25'. This configuration allows for the unloading of one die plate 42 backer plate 43 set from the die cutter 20 while, at the same time, another die plate 42 backer plate 43 set is staged to be loaded into the die cutter 20, thereby reducing transition time between two cutting jobs that use different dies. Once the new die plate 42 and backer plate 43 are installed in die cutter 20, the die plate 42 and backer plate 43 from the previous cutting job will be returned to the die storage system 24. In the embodiment of FIGS. 1-2, any set of loading arms 33 can unload or load dies, and in some embodiments a computerized system will select which loading arms 33 will be used based on the shortest translation distance of the rails to reach the die plate 42 or backer plate 43.

Once in position, the die plate 42 is automatically fastened to the die cutter punch plate 89 using alignment features on the punch plate and die plate and mechanical grippers. The punch plate 89 is supported by punch plate actuator 88 which moves the punch plate 89 and die plate 42 in the Z direction to force the die plate 42 into the sheet 18 of media to cut the sheet and then retract the punch plate 89 and die plate 42. The backer plate 43 is automatically mounted or fastened to the die cutter table using alignment features on the die cutter base plate 48 and backer plate, and mechanical grippers. In another embodiment, such as certain cutters that are retrofit with the die exchange system, the die plate and/or backer plate are manually fastened into place after being moved into a cutting position in the die cutter 20.

In some embodiments, a gripper or tab 49 located on the upstream side of the die storage system 24, which is actuated by lead screw 29, pushes a plate in the X direction, or pulls a plate back onto the die storage system 24. In another embodiment, the loading arms 33 can have downstream grippers and a push/pull mechanism to move a die in the X direction into or out of rails 27 in the die storage system 24. In certain embodiments, the rails 27 and/or loading arms 33 are extendable, and in some cases can telescope to position a die, or have a push/pull mechanism that moves a die into or out of position.

In some embodiments, an operator is able to manually remove or add a die to the die storage system 24 during the die cutting operation by deactivating the die transport system 26 while the die cutter 20 is processing a media job, thereby further increasing efficiency by allowing for die changes for unexpected priority jobs inserted within previously scheduled job flow.

Figures 3A, 3B, 3C:
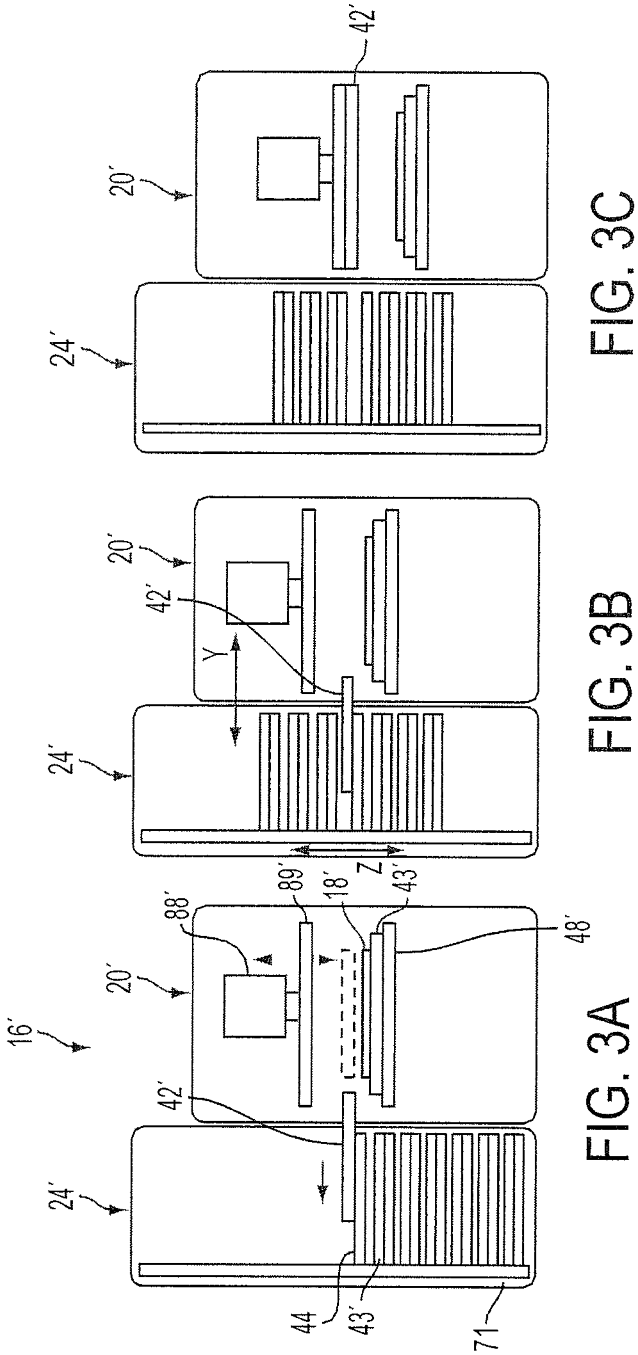
FIG. 3A-3C schematically show elevational views of an embodiment with a die storage system in which the die storage rack moves the die plates vertically upward and downward.

FIG. 3A-3C show an embodiment 10' where the die loader is integrated with a die storage system including an elevator assembly 71 that moves up and down to position a die for insertion into, or removal out of, a die cutter 20'. The die plate and backer plate move first in a Z direction within the die storage system 24', then in a Y direction into the die cutter 20'.

The die storage system 24' contains a plurality of die plates 42' and backer plates 43' that are vertically spaced on horizontally extending supports 44. The supports 44 can be rails, shelves, hangers, or other supporting elements that can be used on a plate storage device. FIG. 3A shows a die being loaded into the die storage system 24'. FIG. 3B shows a die being removed from the die storage system 24', displaced in a Y direction, and loaded into die cutter 20'. FIG. 3C shows a die 42' located and attached in the die cutter 20'. In another embodiment (not shown), the die can pivot between a transport position in the die transport system 26' and a cutting position around a central axis in an arcuate flow path. For the various types of flow paths, the dies are moved vertically (when necessary) and horizontally from a storage position to a cutting position.

Figures 4A, 4B, 5A, 5B, 5C:
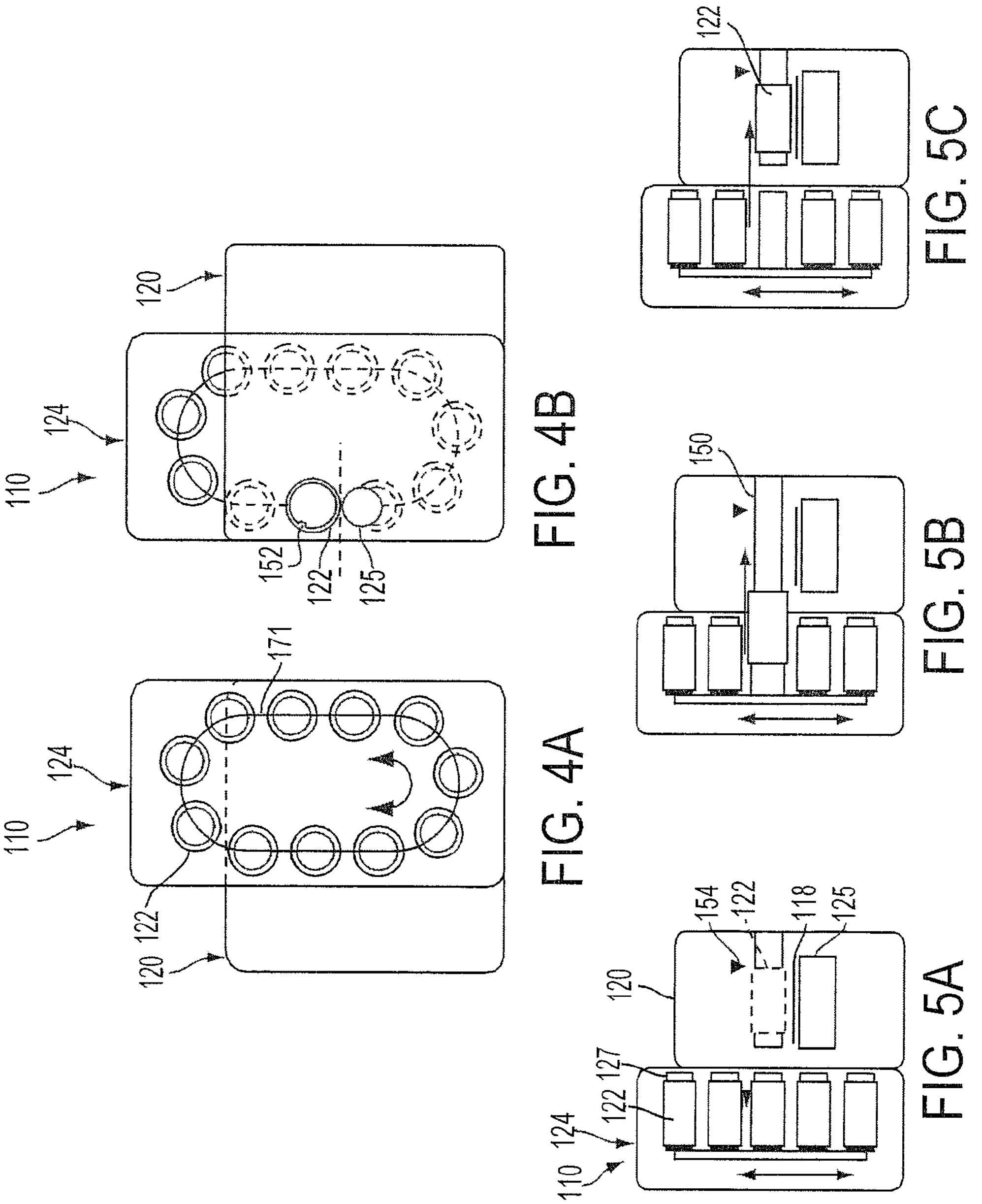
FIGS. 4A-4B schematically show a back elevational view and a front elevational view of an automated die exchange system according to an embodiment using rotary die plates.
FIGS. 5A-5C schematically show end elevational views of the embodiment of FIGS. 4A-4B during die exchange.
Figure 6:
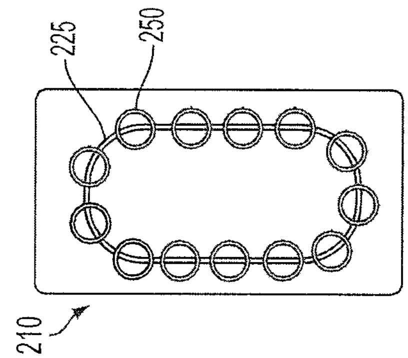
FIG. 6 schematically shows a side elevational view of a rotary die plate or rotary die roll storage system according to an embodiment that stores rotary die drums having plates mounted thereon.
Figure 7C:
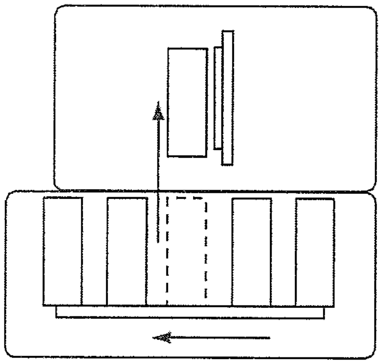
FIGS. 7A-7C schematically show end elevational views of the die storage system of FIG. 6 in combination with a die cutter.
Figure 7B:
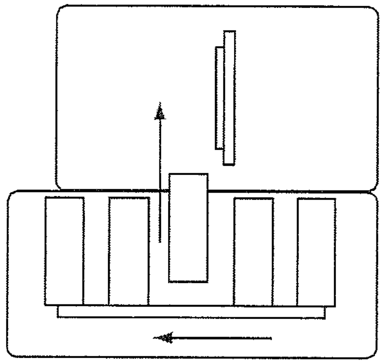
Figure 7A:
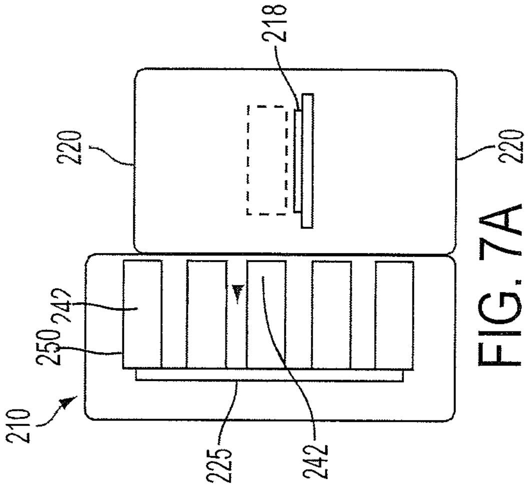

Various configurations can be used for an elevator assembly in the die storage system. In an embodiment (see FIG. 4A below), the elevator assembly 171 has an escalator or "ferris wheel" type movement in which the elevator assembly rotates until a selected die reaches an unloading location, or until an empty support on the die storage system reaches a loading position from which it receives a die removed from the die cutter 120.

In some embodiments, a sensor associated with, or mounted on, the die storage system 124 (or a die transport system 26 in the embodiment of FIG. 1) selects and/or verifies which die set is to be used for an incoming job. This configuration permits an operator to place dies at any available location in the die stack, and the loader will automatically identify the location of a particular die.

FIGS. 4A-4B and 5A-5C show an embodiment of a die exchange system 110 in which a plurality of rotary die plates 122 are stored in a die support system 124 and exchanged into and out of a rotary drum cutter 120 configured to cut a sheet 118 of media. The rotary die plates 122 are arranged in a ferris wheel type drum storage system 124 and the rotatable die plate storage system 124 rotates in response to computerized instructions in order to place a selected die support 127 in position for transfer of a die plate 122 to a rotary die cutter 120. (A ferris wheel type storage system also can be used for storing flat die plates.) The die plate transport system employs a die loader which is configured to transport rotary die plates, rather than flat die plates. After one die plate 122 has been replaced in the storage system 124, the ferris wheel type storage system rotates to position another die plate 122 for transfer. The die plate selected for transfer is removed and placed in the rotary drum cutter 120. The selected die plate 122 is automatically mounted on the rotary drum 150. A drum registration edge 152 and a sensor 154 are used to properly position the rotary die plate 122 on the rotary drum 150, and the plate is fastened with electro magnets or mechanical grippers. An anvil cylinder 125 is positioned below the rotary drum 150 in the die cutter 120. In the embodiment shown in FIGS. 5A-5C, the plates are arranged in the drum storage system 124 on cylindrical die supports 127 having the general size and shape of a rotary drum. A mechanism will push or pull a selected plate onto the rotary drum 150 when loading, or off of the rotary drum 150 when unloading.

FIGS. 6 and 7A-7C show an embodiment of a die exchange system 210 in which a plurality of rotary drums 250 having die plates 242 mounted thereon are stored and exchanged into and out of a rotary drum cutter 220 configured to cut a sheet 218 of media. The rotary drums are arranged in a ferris wheel type drum storage system 225 and the rotatable drum storage system 225 rotates in response to computerized instructions in order to place a selected die support in position for transfer by a drum transport system using rails or another suitable mechanism. The drum transport system employs a die loader which is configured to transport drums with plates mounted thereon, rather than flat die plates. After one drum 250 has been replaced in the storage system, the ferris wheel type storage system rotates to position another drum for transfer which is removed and placed in the rotary drum cutter 220. In one embodiment (not shown), the drums 250 with plates mounted thereon in the die storage system 225 are arranged on spindles that can be extended into the die cutter and aligned with the die cutter drum shaft when the die is to be loaded or unloaded. A mechanism will then push or pull the drum onto the die cutter drum shaft when loading, or off of the die cutter drum shaft when unloading.

Figure 8:
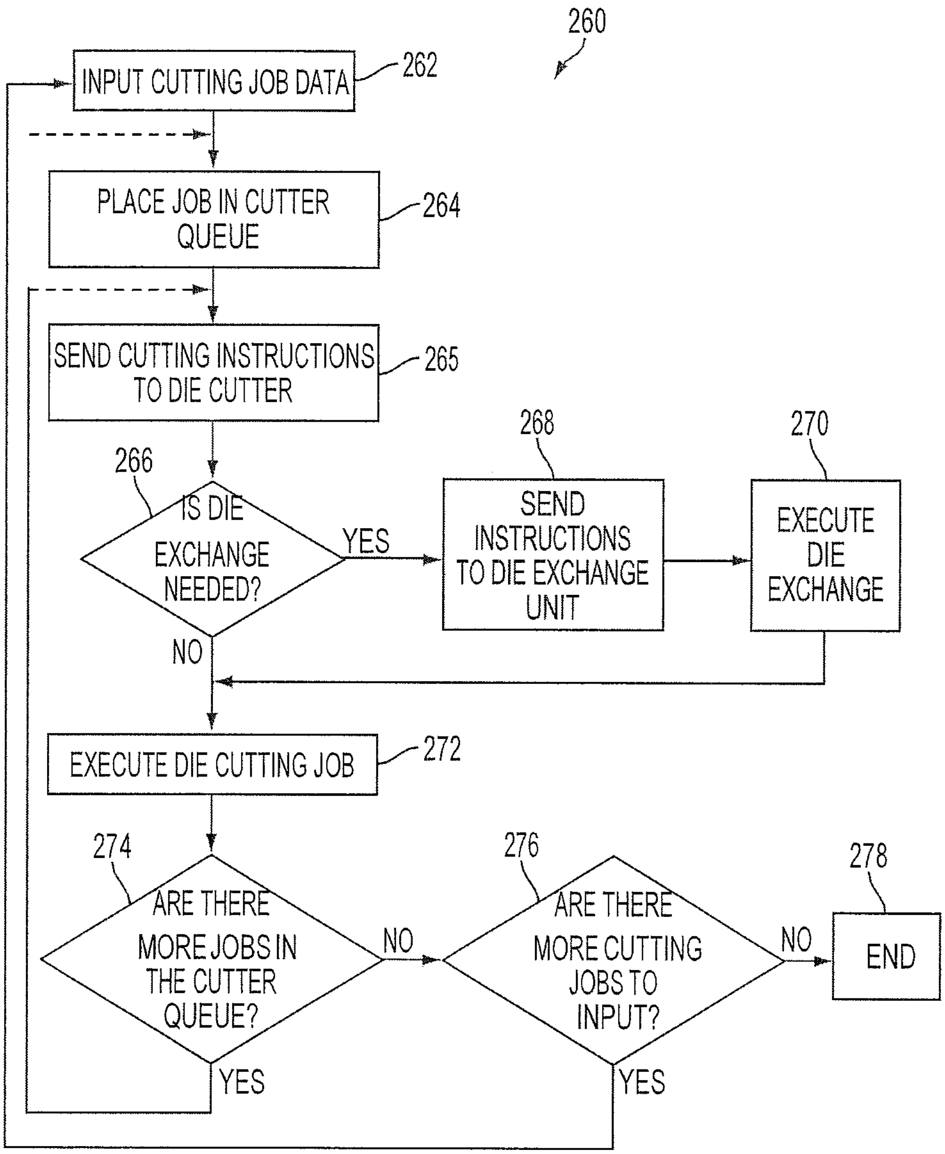
FIG. 8 is a process flow diagram describing operation of a media cutting system with automated die exchange.
Figure 9:
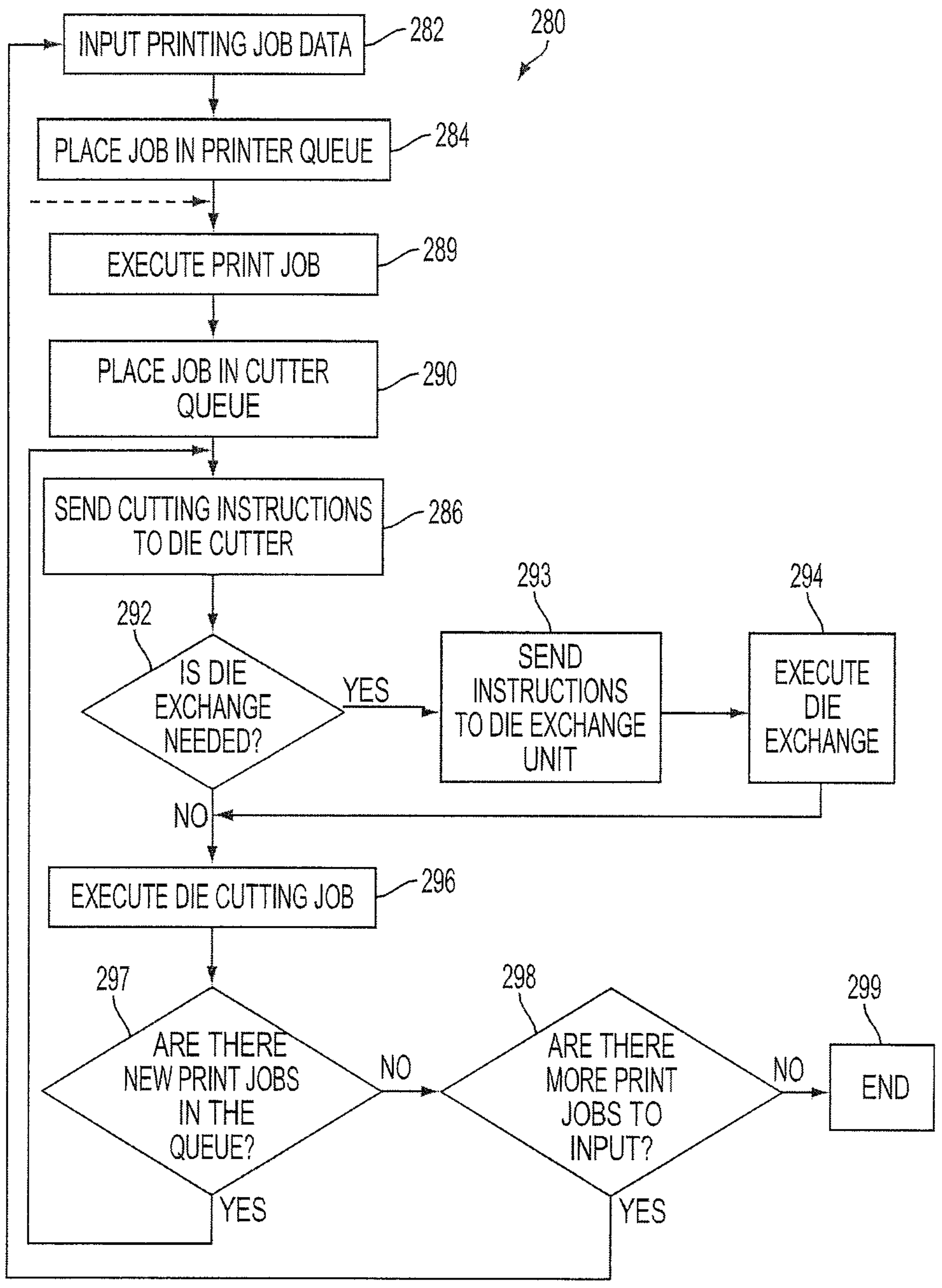
FIG. 9 is a process flow diagram describing operation of a media printing and cutting system with automated die exchange.

FIGS. 8 and 9 are flow charts showing cutting processes with die exchange according to two embodiments. A cutting process with die exchange that can be separate from printing is shown in FIG. 8, and a cutting process with die exchange that is in-line with an upstream printer is shown in FIG. 9. More particularly, as is shown in FIG. 8, the automated cutting and die exchange process is generally designated as 260. An operator or other input device, such as a sensor, which may be an optical reader, which has or is associated with a processor, inputs new cutting job data into the cutting system at 262. The job data is placed in the electronic cutting queue at 262, and the physical media is placed in the cutter queue at 264. When the job is at the front of the queue, the cutting job data is sent to the die cutter computer 265 and the cutter computer determines at 266 whether or not die exchange is needed before cutting. If not, the cutting job is executed at 272. If die exchange is needed, the cutter controller, or another controller linked to the die exchange system, sends instructions at 268 to the die exchange system as to which die should be automatically placed in the cutter. Dies are exchanged (or inserted, if no die is currently in the cutter) at 270. Die exchange can include automatic setting of parameters for the selected die, including die alignment, registration, settings for pressure and/or displacement, etc. The cutting job is then executed at 272.

After a particular cutting job is finished, the cutter controller determines whether there are any additional printing and/or cutting jobs in the queue at 274. If there are more cutting jobs in the queue, the process returns to 264 or 265. If not, the cutter computer determines at 276 whether there is any additional cutting job data to be input. If so, the new cutting job data is input at 262. If not, the process ends at 278.

As is shown in FIG. 9, a printing and cutting process with automated die exchange is generally designated as 280. In this process, the operator inputs the print files job at 282 which is then prioritized and then placed in the printer queue at 284. Printer queue 284 includes electronic print files and required media. Optionally, instructions are sent to the cutter (the instructions may be read by a sensor, or input by an operator, or included in the print files, etc.) regarding which die is to be used at 286 before printing takes place. An early indication of the necessary die provides lead time for the appropriate die to be selected and moved, if necessary, and this may take place before or during printing. Printing is executed at 289 and the printed job is transferred to the physical cutter queue at 290 which may also function as a media job buffer during die exchanges (or proceeds automatically to the cutting zone if no cutter queue, is needed). Cutting instructions are sent to the die cutter at 286 (if not sent earlier). The die exchange system determines whether die exchange is required at 292. If die exchange is not needed, the cutting job is executed at 296. If die exchange is needed, the cutter computer, or another computer linked to the die exchange system, sends instructions to the die exchange system as to which die should be automatically placed in the cutter at 293. Dies are exchanged (or inserted, if no die is currently in the cutter) at 294. Die exchange can include automatic setting of parameters for the selected die, including die alignment, registration, settings for pressure and/or displacement, etc. After the correct die is in place, the cutting job is executed at 296.

After a particular cutting job is finished, the cutter computer determines whether there are any additional printing and/or cutting jobs in the queue at 297. If there are more printing and/or cutting jobs in the queue, the process returns to 286 or 289. If not, the cutter computer determines at 298 whether there are new printing and/or cutting jobs to be input. If so, the new printing and/or cutting job data is input at 282. If not, the process ends at 299.

Figure 10:
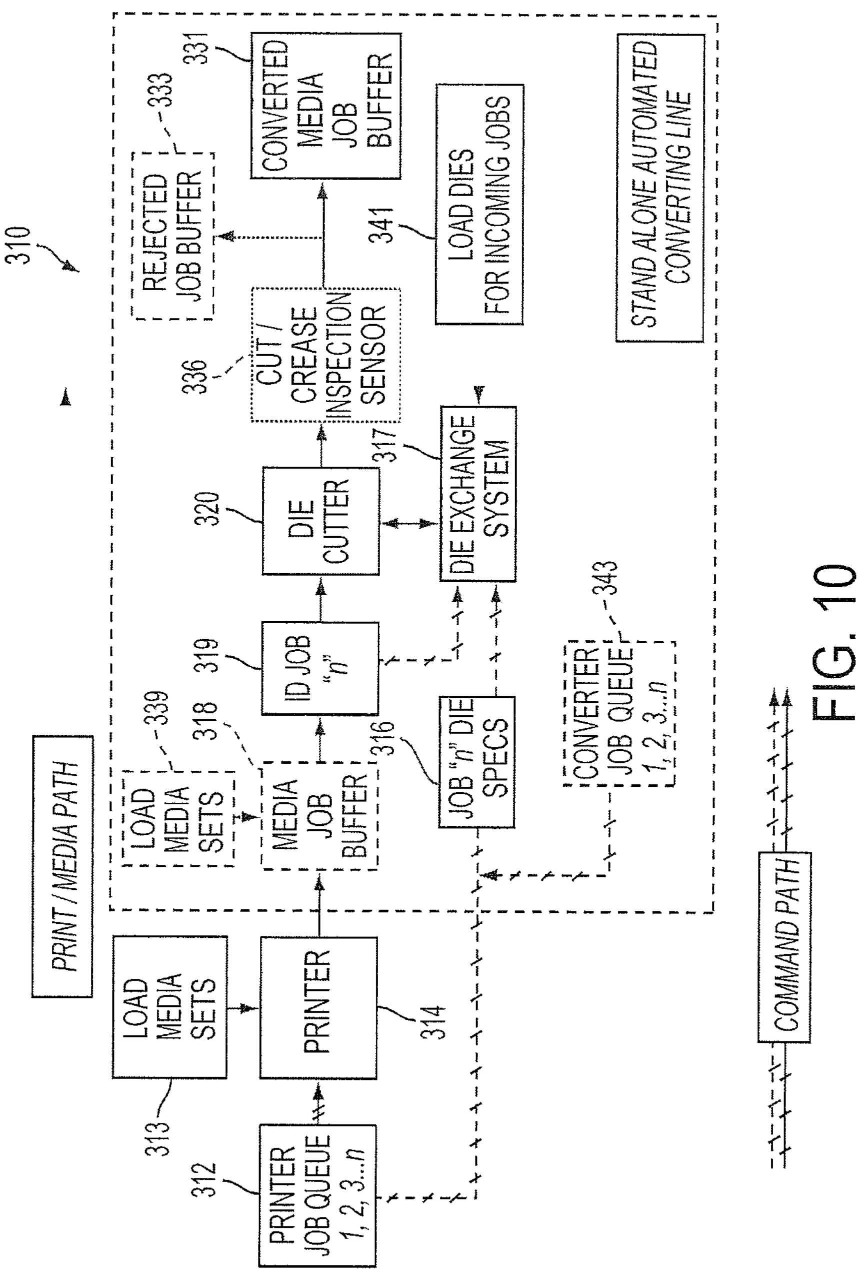
FIG. 10 is a simplified schematic view of a media printing and cutting system according to an embodiment including automatic die exchange.

FIG. 10 schematically shows an embodiment of an in-line media printing and cutting system, as well as an embodiment of a stand-alone automated cutting system, that can be used in various process embodiments, including those of FIGS. 8 and 9. The system of FIG. 10 is generally designated as 310. In the system 310, when a printer is included, the cutter throughput can be configured to coordinate with, and in some cases, match, the throughput of the printer. The printer 314 has a computerized printer job queue 312 that includes, or is configured to receive, instructions as to the die to be used to cut a particular job. The computerized job queue 312 (or software on a digital front end associated therewith) communicates a set of die specifications via a specifications processor 316 to the die exchange system 317, which includes a die transport system and a die storage system, as to which die should be used for each job. Physical media is loaded at loading station 313. A stack of loaded media is printed in the printer 314, exits the printer 314 and optionally is transported to a media job buffer station 318, where it awaits cutting. If the die instructions are not sent from the printer queue, a sensor or other job identifier identifies a particular print job at 319, near the buffer zone 318, and determines which die is to be used to cut the job. Instructions are sent to the die exchange system 317 from the job identifier 319, and/or from the printer queue 312, and/or from a converter job queue 343 (for jobs that do not require printing, as is explained further below) through the specification processor 316. The instructions indicate which die is to be positioned in the cutter. The sheets of media are cut in the die cutter 320, and then they optionally may be inspected using an inspection station sensor 336. Acceptable items are sent to a converted media buffer 331 or other output tray, and rejected items optionally are conveyed to a rejected job buffer 333.

Jobs that do not move directly from the printer 314 to the cutter 320 also can be inserted into the in-line system through a physical loading station 339, which loads jobs into the media job buffer 318. In one embodiment, rush jobs that have been printed on another printer or do not require printing can be loaded at 339 and proceed to the cutter. Jobs entering at loading station 339 are placed in the cutter job queue by inputting information at 343, which is sent to the die exchange system 317. In some cases, the converter job queue 343 merges additional jobs that do not require printing with the jobs that are to be printed and cut. In other cases, the converter job queue 343 arranges for rush jobs from 339 to be cut before the jobs in the existing printer job queue are cut. In this case, the specifications processor 316 containing die specifications processes the instructions from the cutter job queue 343 and printer job queue 312 to determine the cutting die availability in the die storage system 326, loading order and time of use for the cutter dies.

If a die is not available in the die storage system, which is part of the die exchange system 317, an error or warning message will be sent to the operator at the converter job queue 343 or printer job queue 312. A die can be loaded in and out of the die storage system at 341 when the die is not in use in the cutter. Die loading and unloading typically occurs when the system is off-line, however, as mentioned above, the system can be configured to allow for loading and unloading of dies into the die storage system during use of the system. In embodiments, the time required between cutting jobs using different dies typically is 2-8 minutes, or 4-8 minutes, which is shorter than the time required to change dies in a conventional system using manual die exchange between cutting jobs.

Figure 11:
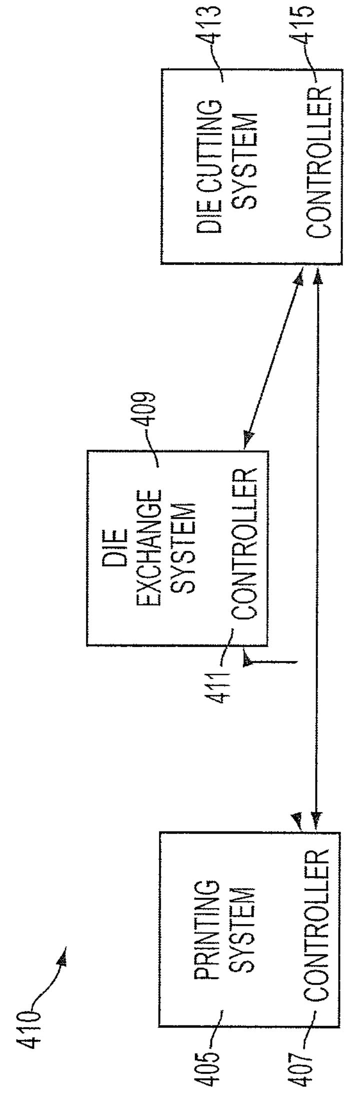
FIG. 11 schematically shows the computer systems used in some embodiments of the process of FIG. 9.

FIG. 11 shows an embodiment including computer systems that can be used in the printing and cutting processes and systems of FIGS. 9 and 10. The in-line printing and cutting system with die exchange 410 can be a modular system that includes a printing system 405 with a printer controller 407, a die exchange system 409 with a die exchange controller 411, and a die cutting system 413 with a cutting controller 415. The three controllers 407, 411 and 415 may communicate with one another such that operation of the die loading and loading system can efficiently change dies in response to instructions regarding jobs moving from the printing system to the cutting system. In embodiments, the die exchange system and the die cutting system can share the same controller. Furthermore, in embodiments, the printing system, die exchange system and die cutting system can share the same controller. In other embodiments the die loading system and die storage system each have their own controller. Each of the in-feeder and the out-feeder for the cutter can be controlled by separate controller, by the same controller, or can be controlled by the cutter controller.

Figure 12:
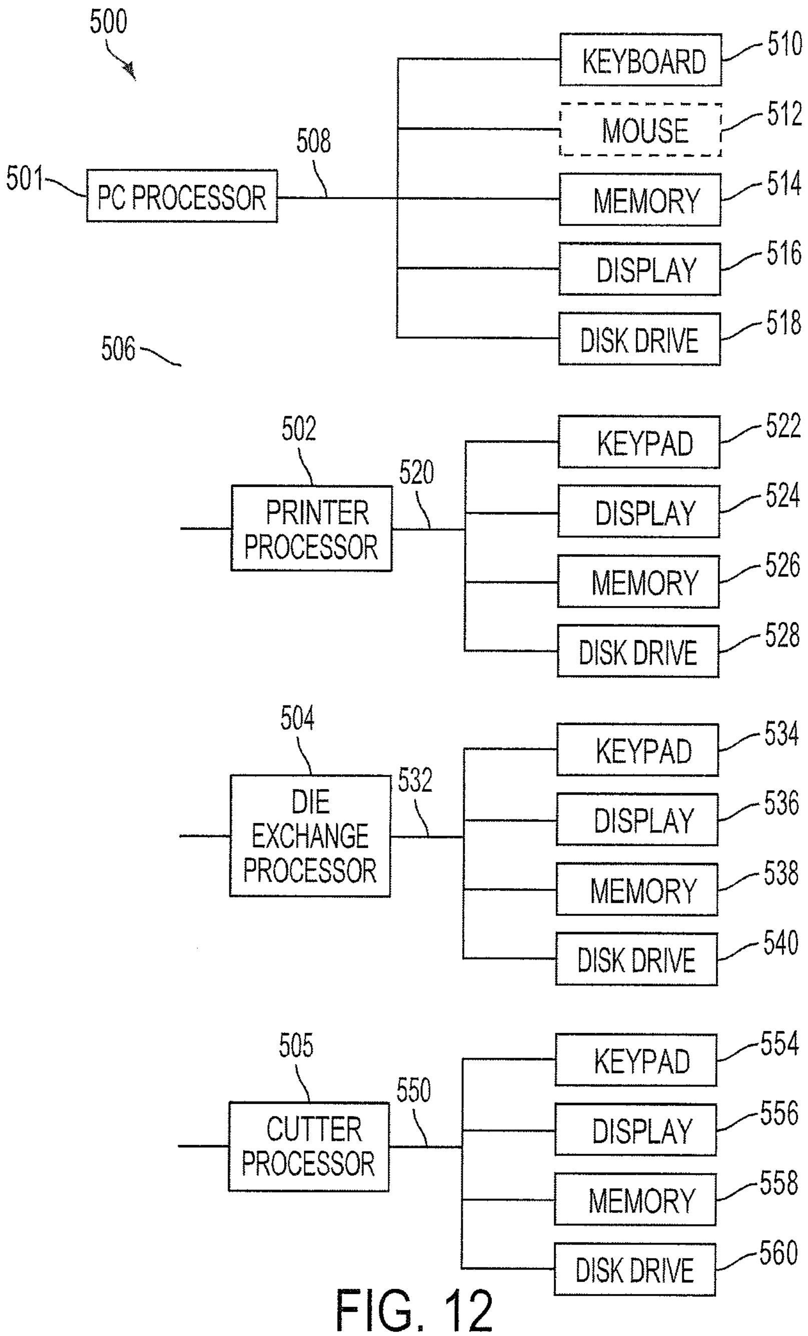
FIG. 12 is a block diagram of an exemplary system that can be used to contain or implement program instructions for embodiments that include an in-line printer.

FIG. 12 is a block diagram of an exemplary system that can be used to contain or implement program instructions for the embodiment of FIG. 10 that includes a printer. The overall media processing system is designated as 500. A PC processor 501, a printer processor 502, a die exchange processor 504 and a cutter processor 505 are interconnected by a bus or other data transfer subsystem 506. A bus or other data transfer subsystem 508 interconnects the PC processor 501 with the other system components, including a keyboard 510, which may be in the form of a physical keyboard and/or a touch screen, an optional mouse 512, a memory 514, a display 516 and one or more disk drives 518 of various types. A bus or other data transfer subsystem 520 interconnects the printer processor 502 with the other system components, including a keypad 522, which may be in the form of a physical keyboard and/or a touch screen, a display 524, a memory 526 and one or more disk drives 528 of various types. A bus or other data transfer subsystem 532 interconnects the die exchange processor 504 with the other system components, including a keypad 534, which may be in the form of a physical keyboard and/or a touch screen, a display 536, a memory 538 and one or more disk drives 540 of various types. A bus or other data transfer subsystem 550 interconnects the cutter processor 505 with the other system components, including a keypad 554, which may be in the form of a physical keyboard and/or a touch screen, a display 556, a memory 558 and one or more disk drives 560 of various types. The electronic connections shown in the figures can be hardwired or wireless depending on the technology selected and available for use. In the embodiment of FIG. 12, the die storage system uses the same processor as the die transport system. In other embodiments, the die storage system can have a separate processor from the die transport system.

Figure 13:
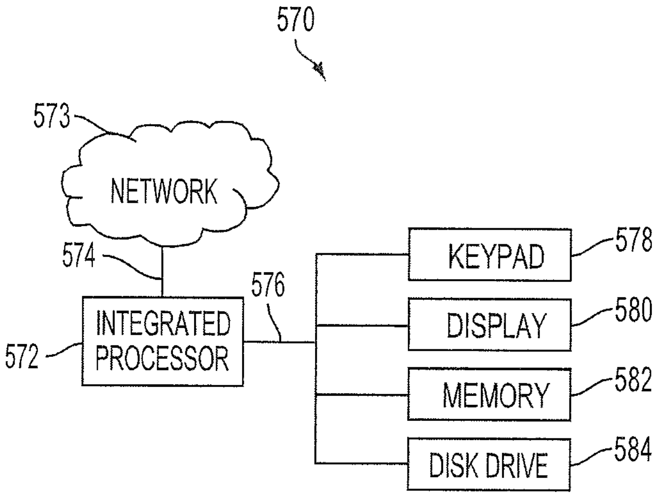
FIG. 13 is a block diagram of an exemplary system that can be used to contain or implement program instructions for embodiments that employ an integrated processor for a cutter, die exchange system and optionally also a printer.

FIG. 13 is a block diagram of an exemplary integrated printing and cutting system 570 with automated die exchange that can be used to contain or implement program instructions for the embodiment of FIG. 10. An integrated processor 572 for printing and cutting, including automated die exchange, is interconnected to a network 573 by a bus or other data transfer subsystem 574 and also to the other system components by a bus or other data transfer subsystem 576. The other system components include a keypad 578, which may be in the form of a physical keyboard and/or a touch screen, a display 580, a memory 582 and one or more disk drives 584 of various types. The electronic connections shown in the figures can be hardwired or wireless depending on the technology selected and available for use. In another embodiment (not shown) the processors for the printer and cutter are integrated, with a separate processor for die exchange. In this embodiment, each processor has its own keypad, display, memory and optional disk drives.

Figure 14:
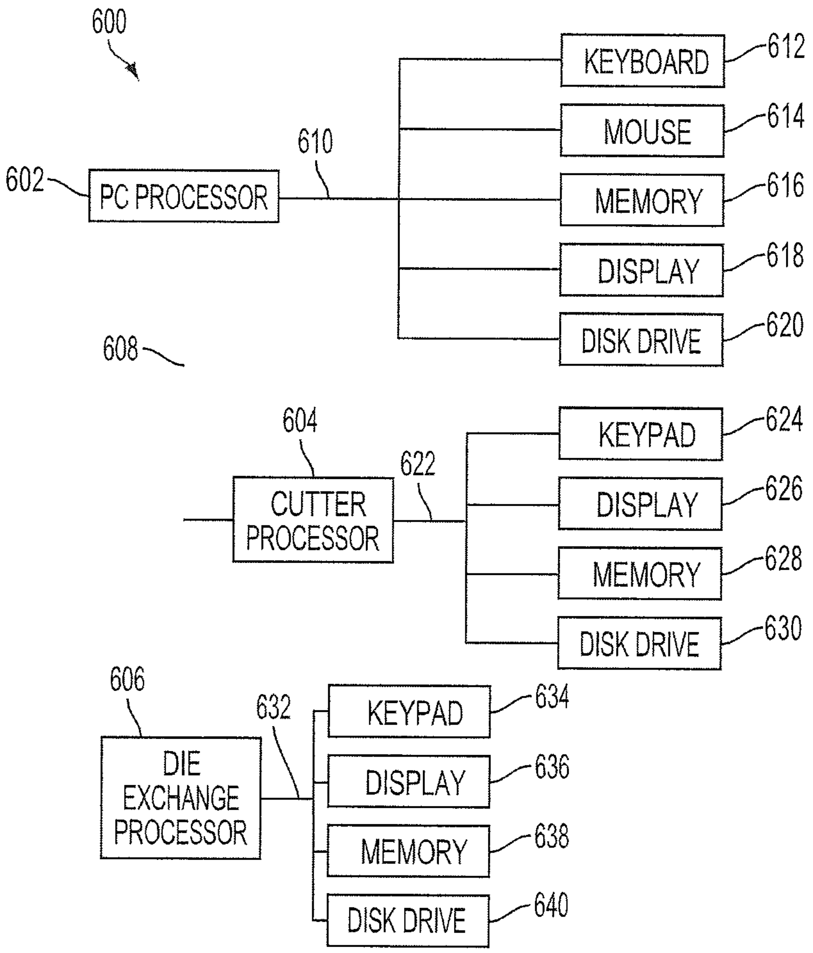
FIG. 14 is a block diagram of an exemplary system that can be used to contain or implement program instructions for embodiments that do not require an in-line printer.

FIG. 14 is a block diagram of an exemplary cutting system 600 with automated die exchange that can be separate from a printer and can be used to contain or implement program instructions for the embodiment of FIG. 10. A PC processor 602, a cutter processor 604, and a die exchange processor 606 are interconnected by a bus or other data transfer subsystem 608. A bus or other data transfer subsystem 610 interconnects the PC processor 602 with the other system components, including a keyboard 612, which may be in the form of a physical keyboard and/or a touch screen, a mouse 614, a memory 616, a display 618 and one or more disk drives 620 of various types. A bus or other data transfer subsystem 622 interconnects the cutter processor 604 with the other system components, including a keypad 624, which may be in the form of a physical keyboard and/or a touch screen, a display 626, a memory 628 and one or more disk drives 630 of various types. A bus or other data transfer subsystem 632 interconnects the die exchange processor 606 with the other system components, including a keypad 634, which may be in the form of a physical keyboard and/or a touch screen, a display 636, a memory 638 and one or more disk drives 640 of various types. The electronic connections shown in the figures can be hardwired or wireless depending on the technology selected and available for use. In the embodiment depicted in FIG. 14, the die storage system uses the same processor as the die transport system.

Non-limiting examples of die cutters that can be used in the embodiments described herein include a Kama® vertical die cutter and a Bobst vertical die cutter. Non-limiting examples of suitable rotary die cutters include a Magnacutter and a Rotomag. Non-limiting example of printers that can be used in the embodiments described herein are an iGen printer from Xerox® Corp. A non-limiting example of an existing system that can be adapted in accordance with embodiments described herein in an iGen-Gallop Packaging Solution.

The embodiments shown in FIGS. 1-14 are particularly well-suited to cut in the range of 20-200 sheets of media per minute, or 50-100 sheets per minute, depending on the complexity of the cutting performed. Print jobs in the range of 10-5000 pieces, or 10-1500 pieces, or 10-500 pieces can all be efficiently run on the same machine.

The embodiments described herein enable a print shop to produce both large and small print jobs profitably by increasing overall output rates for multiple job runs as compared to conventional equipment when dies are exchanged manually by a dedicated operator.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

What is claimed is:

1. A media cutting system comprising:

a rotary die cutter comprising a media cutting table, a die exchange system configured to automatically move a selected rotary die between a storage position in the die exchange system and a cutting region in the rotary die cutter, the die exchange system including a die transport system, and a die storage system configured to support a plurality of rotary dies on a plurality of rotary die supports, the die storage system further comprising a ferris wheel type elevator configured to displace the selected rotary die from a storage position to a loading position, the die transport system comprising a die positioning mechanism configured to move the selected rotary die horizontally from the loading position in the rotary die cutter, and a computer system comprising a controller configured to operate the die transport system and the rotary die cutter.

2. The media cutting system of claim 1, further including a first optical reader positioned upstream from the rotary die cutter to read data on a sheet of media indicative of the rotary die to be used to cut the sheet.

3. The media cutting system of claim 2, wherein the controller receives die selection data from the first optical reader.

4. The media cutting system of claim 1, further comprising a printer positioned in-line with the rotary die cutter.

5. The media cutting system of claim 1, wherein the printer is positioned upstream from the rotary die cutter.

6. The media cutting system of claim 5, wherein the controller is configured to receive die selection data from a processor associated with the printer.

7. The media cutting system of claim 6, further comprising a buffer system disposed between the printer and the rotary die cutter.

8. The media cutting system of claim 6, wherein no buffer system is included between the printer and the rotary die cutter.

9. The media cutting system of claim 1, further comprising a second optical reader configured to associate data on a die with a location on a die storage support.

10. The media cutting system of claim 1, further comprising a vision inspection system positioned downstream from the rotary die cutter configured to determine the precision of a cut made on a sheet of media.

11. The media cutting system of claim 1, wherein the selected rotary die is located on a drum, and the drum with the selected rotary die mounted thereon is moved horizontally from the loading position into the rotary die cutter.

12. The media cutter system of claim 1, wherein the selected rotary die comprises a plate, and the die transport system includes a positioning sensor configured to position the plate on a rotary drum disposed in the die cutter.

13. A die exchange system comprising:

a die transport system, and a die storage system configured to support a plurality of rotary dies on a plurality of rotary die supports, the die storage system further comprising a ferris wheel type elevator configured to displace a selected rotary die from a storage position to a loading position, the die transport system comprising a die positioning mechanism configured to move the selected rotary die horizontally from the loading position into a rotary die cutter.

14. The system of claim 13, wherein the die exchange system is configured to be retrofitted to an existing rotary die cutter.

15. The system of claim 13, wherein the die exchange system receives die selection data from at least one of the rotary die cutter and an indicia reader associated with the rotary die cutter.

16. A method of cutting media, comprising:

obtaining a first set of media sheets, automatically selecting a first rotary die to be used to cut the first set of media sheets, automatically positioning the first rotary die in a die cutter using the die exchange system of claim 13.

17. The method of claim 16, further comprising:

cutting the first set of media sheets using the first rotary die, automatically removing the first rotary die from the die cutter, obtaining a second set of media sheets, automatically selecting a second rotary die to be used to cut the second set of media sheets, automatically positioning the second rotary die in the die cutter in a cutting position, automatically adjusting cutting parameters for the second rotary die, and cutting the second set of media sheets using the second rotary die.

18. The system of claim 13, wherein the selected rotary die is located on a drum, and the drum with the selected rotary die mounted thereon is moved horizontally from the loading position into the rotary die cutter.

19. The system of claim 13, wherein the selected rotary die comprises a plate, and the die transport system includes a positioning sensor configured to position the plate on a rotary drum disposed in the die cutter.

* * * * *